Nov. 2, 1943.  A. SCRIVENER  2,333,341
TOOL SLIDE ADJUSTING MEANS
Filed March 23, 1943
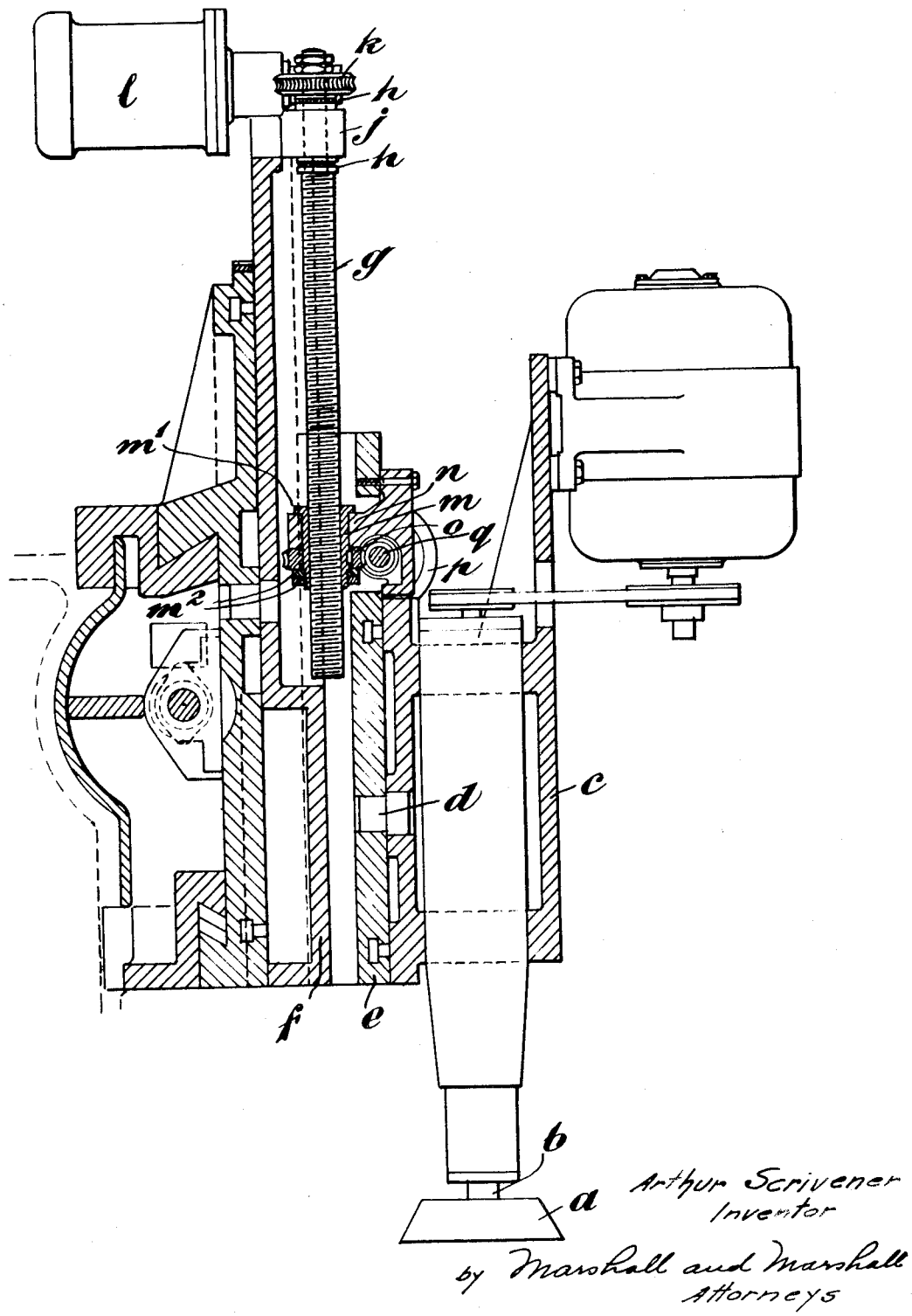
Arthur Scrivener
Inventor
by Marshall and Marshall
Attorneys Patented Nov. 2, 1943

2,333,341

UNITED STATES PATENT OFFICE 2,333,341

TOOL SLIDE ADJUSTING MEANS

Arthur Scrivener, Birmingham, England

Application March 23, 1943, Serial No. 480,158
In Great Britain March 3, 1942

2 Claims. (Cl. 51—166)

This invention has reference to improvements connected with slideway grinders or other machine tools incorporating an adjustable slide.

The object of the invention is to provide what may be termed a differential or dual setting control of the slide whereby a relatively quick preliminary or initial setting of the tool or work can be effected and an ultimate or final setting can be effected by what may be termed an auxiliary or subordinate control mechanism.

The invention consists in the application to a slideway grinder or other machine tool incorporating an adjustable slide of a dual or differential control mechanism for effecting a setting of the slide, whereby a relatively quick initial setting may be achieved, and the final setting can be effected by a control which is subordinate to the initial setting mechanism, both of the setting mechanisms being associated with a common spindle.

A specific application of the invention will now be described with reference to the accompanying sheet of drawings which illustrate a slideway grinder of a known construction in which is embodied the features of the present invention.

The drawing is a part sectional side elevation on a line approximating to the longitudinal centre-line through the main vertical spindle.

The grinding wheel $a$ is mounted through the spindle $b$ and the housing $c$ and the parts contained within the housing by means of the pivotal connection $d$ to a slide $e$ which slide is permitted a vertical motion in a slideway $f$ formed in and as part of the framework of the machine. The slide $e$ is mounted relative to a vertically disposed screwed spindle $g$ which at its upper end is located within a pair of thrust bearings $h$ mounted on either side of a laterally extending bracket $j$ forming part of the main framework of the machine. The upper end of this screwed spindle $g$ has mounted thereon a worm wheel $k$ to which rotation is imparted from the worm drive of a small electric motor $l$ embodying a reverse control gear, the casing of the motor $l$ being mounted on the framework of the machine and serving to effect the initial or preliminary major adjustment of the slide $e$ whereby the grinding wheel $a$ is directed toward or away from the work at a relatively quick setting speed.

Located on and toward the lower end of the vertically disposed screwed spindle $g$ is a sleeve nut $m$ which is rotatably mounted within a bracket $n$ laterally extending from and forming part of the adjustable slide $e$. This sleeve nut $m$ is keyed to a worm wheel $o$, the arrangement being such that the rotation of the worm wheel $o$ and the coupled sleeve nut $m$ by means of a hand wheel control indicated at $p$ which rotates the worm $q$ will effect a lifting or lowering motion of the slide $e$ upon the screwed spindle $g$, whereby the final or minute setting of the grinding wheel $a$ can be effected to complete the initial quick setting which has been effected through the motor drive. The sleeve nut $m$ and the associated worm wheel $o$ are restrained from vertical motion within the bracket $n$ by means of the flange $m^1$ on the sleeve nut $m$ and the pair of lock nuts $m^2$ which also serve to retain the worm wheel $o$ relative to the sleeve nut $m$.

It should be appreciated that when the motor drive is operating the friction obtaining in the hand wheel controlled final or vernier setting mechanism and the slide connection members $pqom$ is sufficient to maintain the worm wheel $o$ and the coupled sleeve nut $m$ stationary, and to permit of the vertical adjustment of the screwed spindle $g$ therethrough; and that on the other hand when the hand-controlled final adjustment mechanism controlled by the hand wheel $p$ is in operation, the friction obtaining in the motor driven worm gear for the initial or relatively quick setting motion is sufficient to maintain this gear transmission stationary, i. e. when the final or vernier adjustment of the slide $e$ is being effected the screwed spindle $g$ is held stationary and the slide $e$ and the parts associated therewith can be vertically adjusted thereon.

In order to secure an accurate final setting of the grinding wheel $a$ through the hand wheel controlled mechanism it is desirable that any back lash or slack which might possibly obtain in the motor driven gear transmission is avoided, and this can be accomplished by incorporating a spring or other loading of the motor driven worm transmission so as to ensure that there is always a tendency or bias of this gearing in the one direction.

It will be appreciated that this invention can be applied with equal advantage to other forms of machine tools than slideway grinders, for instance it can be applied to a machine tool in which the work is mounted on the slide and the slide requires to be adjustably set in relation to a fixed tool mounting.

It is further to be appreciated that this invention could be utilised in connection with other forms of power-operated feed mechanism where it is desired that the feed should operate at two different speeds, i. e. say a quick run up with a slow approach or a relatively slow feed and quick return, and that the invention is not limited to the particular application described in this specification.

I claim:

1. In a device of the class described, in combination, a feed slide, a collar connected to the slide, a sleeve journaled in and projecting from the collar, a gear fixed on a projecting portion of the sleeve, means for restraining the sleeve and gear against endwise movement with respect to the collar, a screw threaded in the sleeve, means for driving the screw for rapid traverse of the slide, and means for driving the gear for slow feed of the slide.

2. In a device of the class described, in combination, a feed slide, a collar connected to the slide, a sleeve journaled in and projecting from the collar, a gear keyed on a projecting portion of the sleeve, a flange on one end of the sleeve, a pair of lock nuts threaded on the other end of the sleeve for cooperating with the flange to restrain the sleeve and gear against endwise movement with respect to the collar, a screw threaded in the sleeve, means for driving the screw for rapid traverse of the slide, and means for driving the gear for slow feed of the slide.

ARTHUR SCRIVENER.